United States Patent
Hamano et al.

(10) Patent No.: US 7,057,818 B2
(45) Date of Patent: Jun. 6, 2006

(54) ZOOM LENS AND OPTICAL APPARATUS HAVING THE SAME

(75) Inventors: Hiroyuki Hamano, Ibaraki (JP); Norihiro Nanba, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 360 days.

(21) Appl. No.: 10/406,757

(22) Filed: Apr. 2, 2003

(65) Prior Publication Data

US 2003/0231388 A1 Dec. 18, 2003

(30) Foreign Application Priority Data

Apr. 4, 2002 (JP) .......................... 2002-102763

(51) Int. Cl.
*G02B 27/64* (2006.01)

(52) U.S. Cl. .................. 359/557; 359/556; 359/555; 359/432

(58) Field of Classification Search ............... 359/557, 359/554–556, 431–435
See application file for complete search history.

(56) References Cited

U.S. PATENT DOCUMENTS

| | | | |
|---|---|---|---|
| 5,039,211 A | 8/1991 | Maruyama | |
| 5,270,857 A | 12/1993 | Oizumi et al. | |
| 5,585,966 A | 12/1996 | Suzuki | |
| 6,414,800 B1 | 7/2002 | Hamano | |
| 6,473,231 B1 | 10/2002 | Hamano et al. | |

FOREIGN PATENT DOCUMENTS

| | | |
|---|---|---|
| JP | 1981-0021133 | 8/1982 |
| JP | 1989-116619 | 10/1987 |
| JP | 1990-124521 | 5/1990 |
| JP | 1986-223819 | 5/1995 |
| JP | 1995-128619 | 5/1995 |
| JP | 1995-199124 | 8/1995 |
| JP | 1998-260356 | 9/1998 |
| JP | 2001-66500 | 3/2001 |

*Primary Examiner*—Scott Sugarman
(74) *Attorney, Agent, or Firm*—Morgan & Finnegan, LLP

(57) ABSTRACT

A zoom lens which has a high variable magnification ratio and high optical performance and an optical apparatus having the zoom lens are provided. A zoom lens according to an embodiment of the present invention comprises, in order from an object side, a first, second, third, and a fourth lens unit respectively having positive, negative, positive and positive optical powers. For zooming from the wide angle end to the telephoto end, the first lens unit is moved to an object side, the second lens unit is moved to an image plane side, the third lens unit is moved to the object side, and the fourth lens unit is moved to the object side. The third lens unit is movable in a direction perpendicular to the optical axis to correct an image blur.

21 Claims, 12 Drawing Sheets

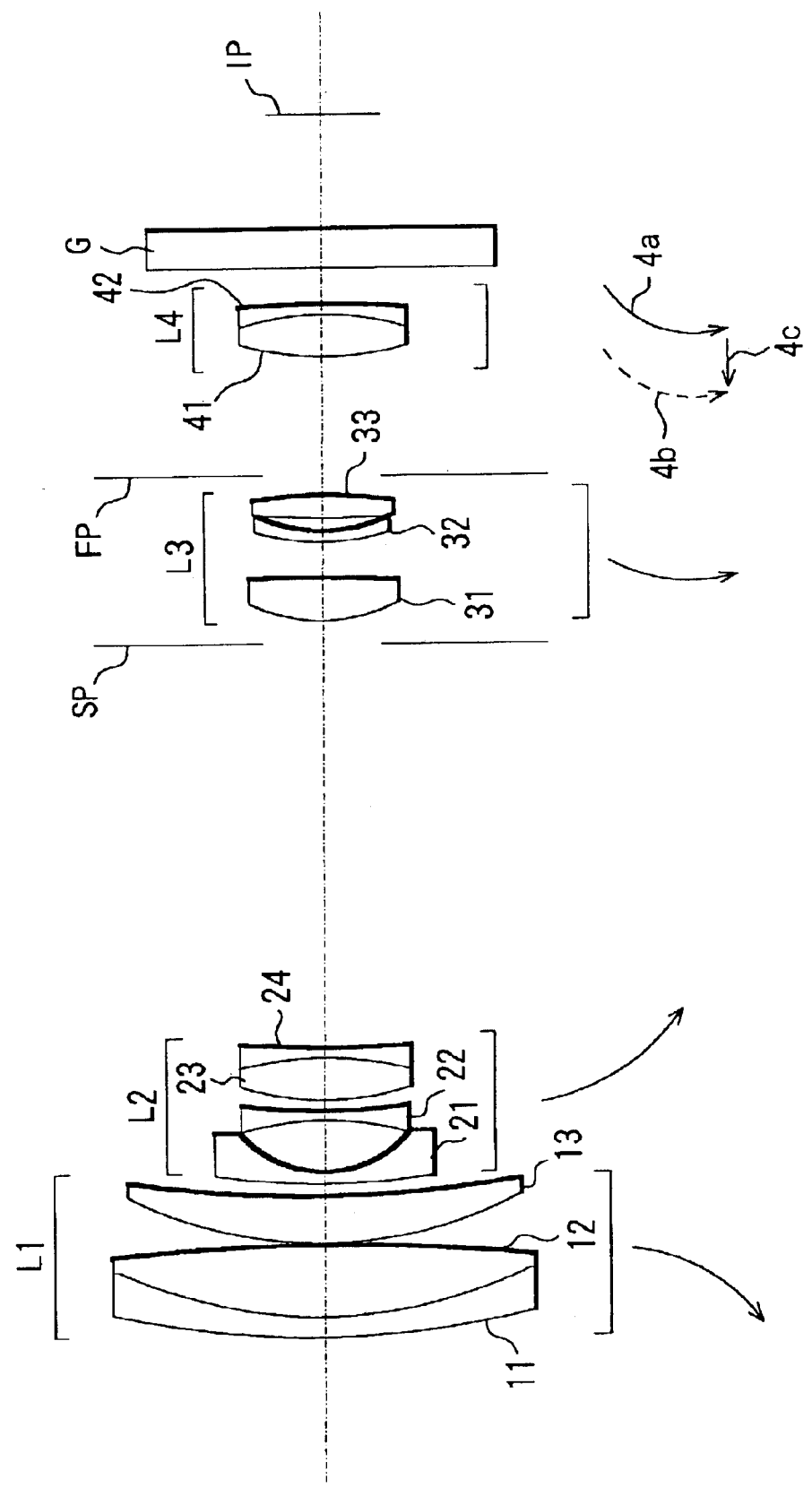

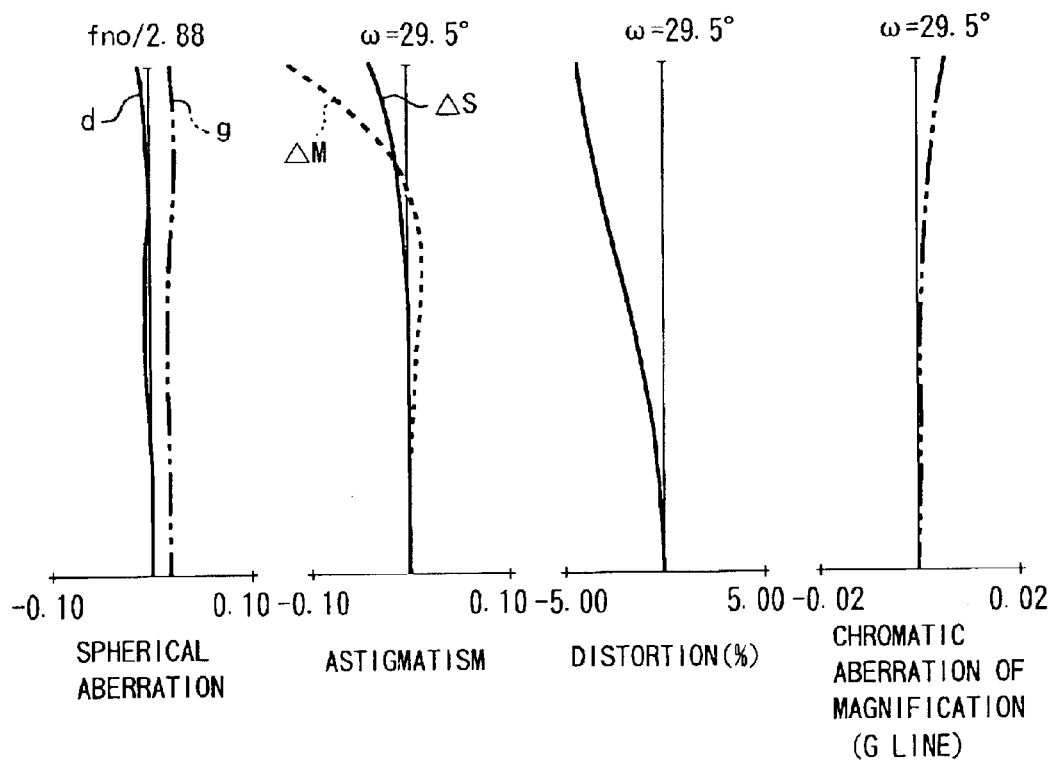
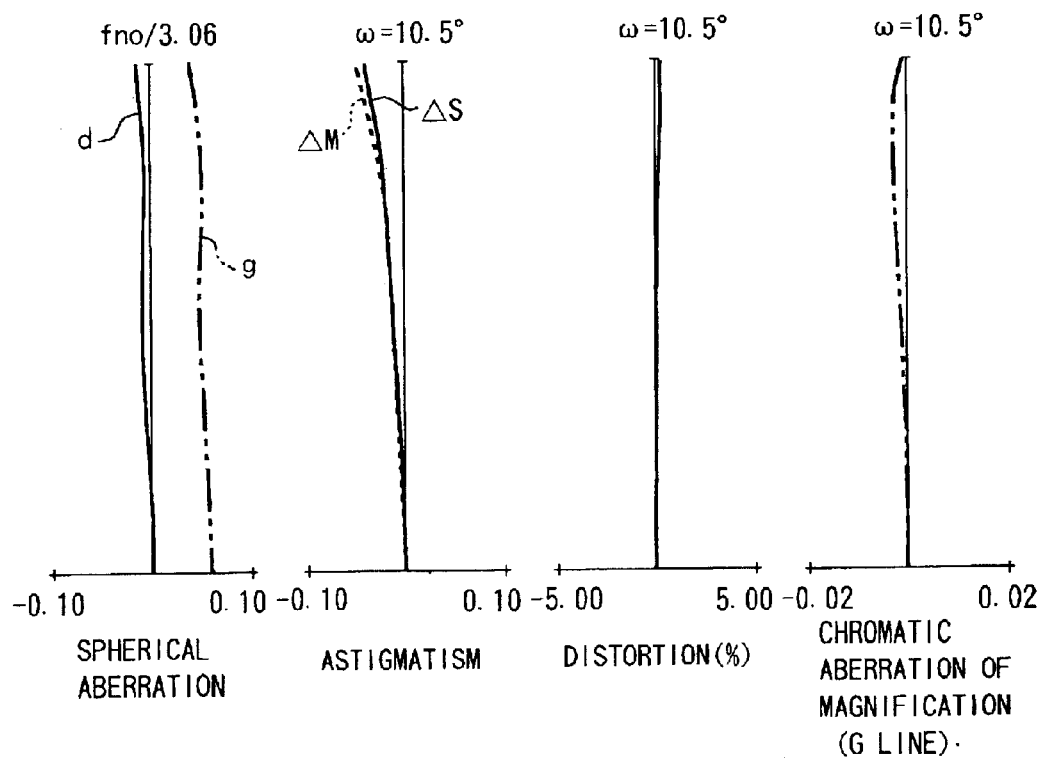

REFERENCE STATE

CAMERA SHAKE OCCURRING

LENS UNIT SHIFTING

VIBRATION ISOLATION ACHIEVED

ZOOM LENS AND OPTICAL APPARATUS HAVING THE SAME

BACKGROUND OF THE INVENTION

1. Field of the Invention

The present invention relates to a zoom lens which is suitable for use in a still camera, a video camera, a silver film camera, a digital still camera and the like, and an optical apparatus having the zoom lens.

More specifically, the present invention relates to a zoom lens having a vibration isolation function in which a lens unit forming a part of an optical system is moved in the direction having a component perpendicular to an optical axis to optically correct a blur of an image caused when the optical system vibrates (or is tilted), thereby obtaining a taken image with no blur.

2. Description of the Related Art

When a photographer riding on a running vehicle or a flying airplane and the like attempts to take an image, vibrations are transmitted to an image-taking system to cause camera shake, resulting in a blur of a taken image. Conventionally, various vibration isolation optical systems have been proposed which have a function of preventing a blur of a taken image (a vibration isolation function).

For example, Japanese Patent Application Laid-Open No. 1981-21133 discloses an optical apparatus which corrects an image blur (isolates vibrations) to obtain an image with no blur by detecting vibrations by a detection means and moving a part of optical members of the optical apparatus in accordance with an output signal from the detection means in such a direction as to cancel out a vibrational displacement of an image due to the vibrations. Japanese Patent Application Laid-Open No. 1986-223819 discloses an image-taking system having a variable apical angle prism disposed closest to an object, in which the apical angle of the variable apical angle prism is varied in accordance with vibrations of the image-taking system to correct an image blur to obtain an image with no blur. In Japanese Patent Application Laid-Open No. 1989-116619 (corresponding to U.S. Pat. No. 5,270,857) and Japanese Patent Application Laid-Open No. 1990-124521 (corresponding to U.S. Pat. No. 5,039,211), an acceleration sensor is used to detect vibrations of an image-taking system, and a lens unit forming a part of the image-taking system is caused to vibrate in a direction perpendicular to an optical axis in accordance with a signal provided from the detection, thereby producing an image with no blur.

Japanese Patent Application Laid-Open No. 1995-128619 discloses a zoom optical system of a four lens unit structure which comprises a first, second, third, and fourth lens unit having positive, negative, positive, and positive optical powers (the power is the reciprocal of a focal length), respectively. The third lens unit includes two lens elements having positive and negative optical powers, respectively, in which the lens element having the positive optical power is caused to vibrate to correct an image blur. Japanese Patent Application Laid-Open No. 1995-199124 (corresponding to U.S. Pat. No. 5,585,966) discloses a zoom optical system of a four lens unit structure which comprises a first, second, third, and fourth lens unit having positive, negative, positive, and positive optical powers, in which the entire third lens unit is caused to vibrate to correct an image blur.

Japanese Patent Application Laid-Open No. 2001-66500 (corresponding to U.S. Pat. No. 6,414,800) discloses a zoom lens of a four lens unit structure which comprises a first, second, third, and fourth lens unit having positive, negative, positive, and positive optical powers. The first, second, and fourth lens units and an aperture stop are moved for zooming, and the entire third lens unit is caused to vibrate to correct an image blur.

In an optical apparatus such as a digital still camera, there are severe restrictions on the overall length of its lens system. When not used (when no image is taken), lens units are generally collapsed and accommodated in the optical apparatus.

When a correction optical system for vibration isolation such as the variable apical angle prism is disposed in the front part of an image-taking system, the presence of the correction optical system of large size in the front part of the optical systems causes problems in terms of space and load on an actuator if the entire lens system is collapsed and accommodated.

In addition, the vibration isolation optical system for providing vibration isolation by using the variable apical angle prism involves large decentering chromatic aberration of magnification in providing vibration isolation especially at a longer focal length.

On the other hand, the vibration isolation optical system for providing vibration isolation by decentering some lenses of the image-taking system in parallel in a direction perpendicular to the optical axis has an advantage of requiring no additional optical system for vibration isolation. However, large decentering aberration may occur in providing vibration isolation to degrade optical performance.

Japanese Patent Application Laid-Open No. 1998-260356 (corresponding to U.S. Pat. No. 6,473,231) discloses an optical system which advantageously achieves high magnifications, but a heavy load is placed on an actuator for moving a first lens unit when it is collapsed due to the large effective diameter thereof.

Japanese Patent Application Laid-Open No. 2001-66500 (corresponding to U.S. Pat. No. 6,414,800) discloses an optical system which advantageously reduces the overall length of the optical system at the wide angle end, but tends to have a frontmost lens unit of large effective diameter since a third lens unit is fixed and each lens unit is not always moved under optimal conditions.

SUMMARY OF THE INVENTION

It is an object of the present invention to provide a zoom lens which achieves a high variable magnification ratio and high optical performance.

It is another object of the present invention to provide a zoom lens which corrects an image blur occurring when the zoom lens vibrates (or is tilted).

According to an embodiment of the present invention, a zoom lens comprises, in order from an object side, a first lens unit which has a positive optical power, a second lens unit which has a negative optical power, a third lens unit which has a positive optical power, and a fourth lens unit which has a positive optical power. Each lens unit is moved in an optical axis direction for zooming, and the third lens unit is movable in a direction having a component perpendicular to the optical axis.

For zooming, the first lens unit is moved to be positioned closer to an object at the telephoto end than at the wide angle end, the second lens unit is moved to be positioned closer to an image plane at the telephoto end than at the wide angle end, and the third lens unit is moved to be positioned closer to the object at the telephoto end than at the wide angle end. The fourth lens unit is moved along a convex track toward the object or moved monotonously toward the object during zooming from the wide angle end to the telephoto end.

According to another embodiment of the present invention, a zoom lens comprises, in order from an object side to an image side, a first lens unit which has a positive optical power, a second lens unit which has a negative optical power, a third lens unit which has a positive optical power, and a fourth lens unit which has a positive optical power. During zooming, the first lens unit is moved to be positioned closer to an object at the telephoto end than at the wide angle end, the second lens unit is moved to be positioned closer to an image plane at the telephoto end than at the wide angle end, the third lens unit is moved to be positioned closer to the object at the telephoto end than at the wide angle end, and the fourth lens unit is moved to be positioned closer to the object at the telephoto end than at the wide angle, and the following conditions are satisfied:

$$0.5 < f1/ft < 1.0$$

$$0.05 < |m1/m2| < 0.5$$

$$0.25 < |f2|/\sqrt{fw \cdot ft} < 0.6$$

where fi represents of a focal length of the i-th lens unit, fw and ft represent the focal lengths of the entire zoom lens at the wide angle end and at the telephoto end, respectively, and m1 and m2 represent the movement amounts of the first lens unit and the second lens unit during zooming from the wide angle end to the telephoto end, respectively.

Other aspects of the present invention will be apparent from embodiments described below.

BRIEF DESCRIPTION OF THE DRAWINGS

FIG. 1 is a section view of lenses of a zoom lens in Embodiment 1 of the present invention;

FIG. 2 shows aberrations at the wide angle end in Embodiment 1 of the present invention;

FIG. 3 shows aberrations at an intermediate zoom position in Embodiment 1 of the present invention;

DESCRIPTION OF THE PREFERRED EMBODIMENTS

Description is hereinafter made for embodiments of a zoom lens of the present invention and an optical apparatus having the zoom lens.

Figure 4:
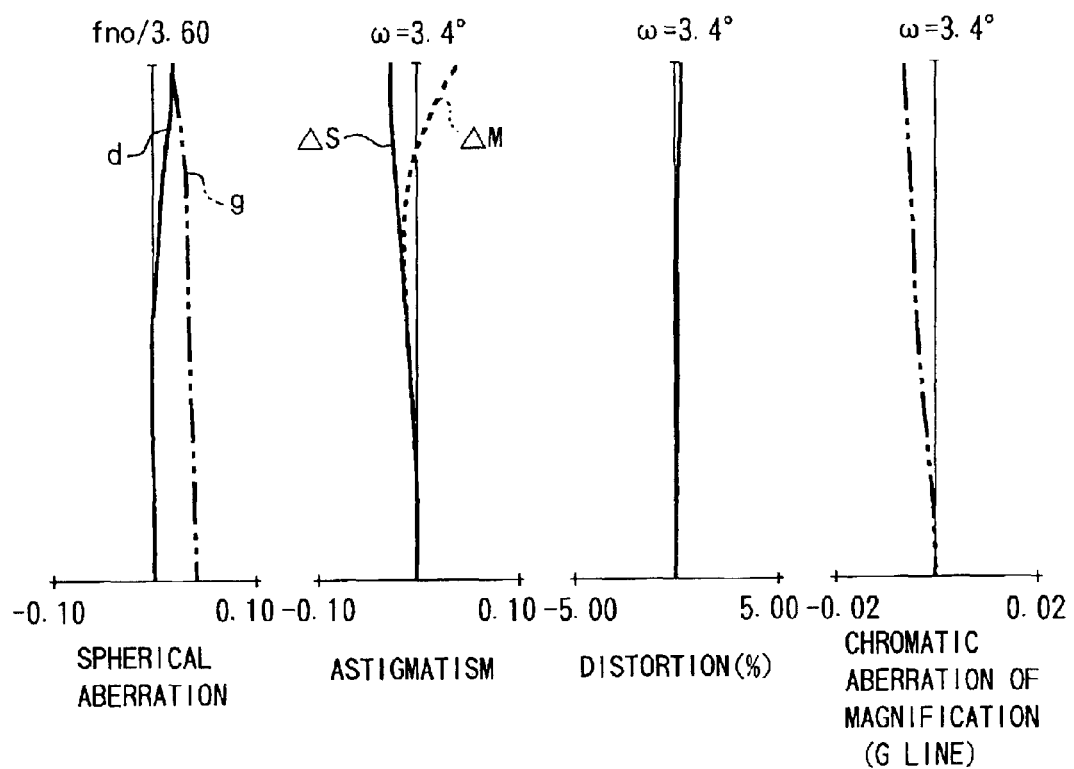
FIG. 4 shows aberrations at the telephoto end in Embodiment 1 of the present invention.

FIG. 1 is a section view of lenses at the wide angle end of a zoom lens in Embodiment 1 of the present invention. FIGS. 2, 3, and 4 show aberrations at the wide angle end, an intermediate zoom position, and the telephoto end of the zoom lens in Embodiment 1 of the present invention, respectively.

Figure 5:
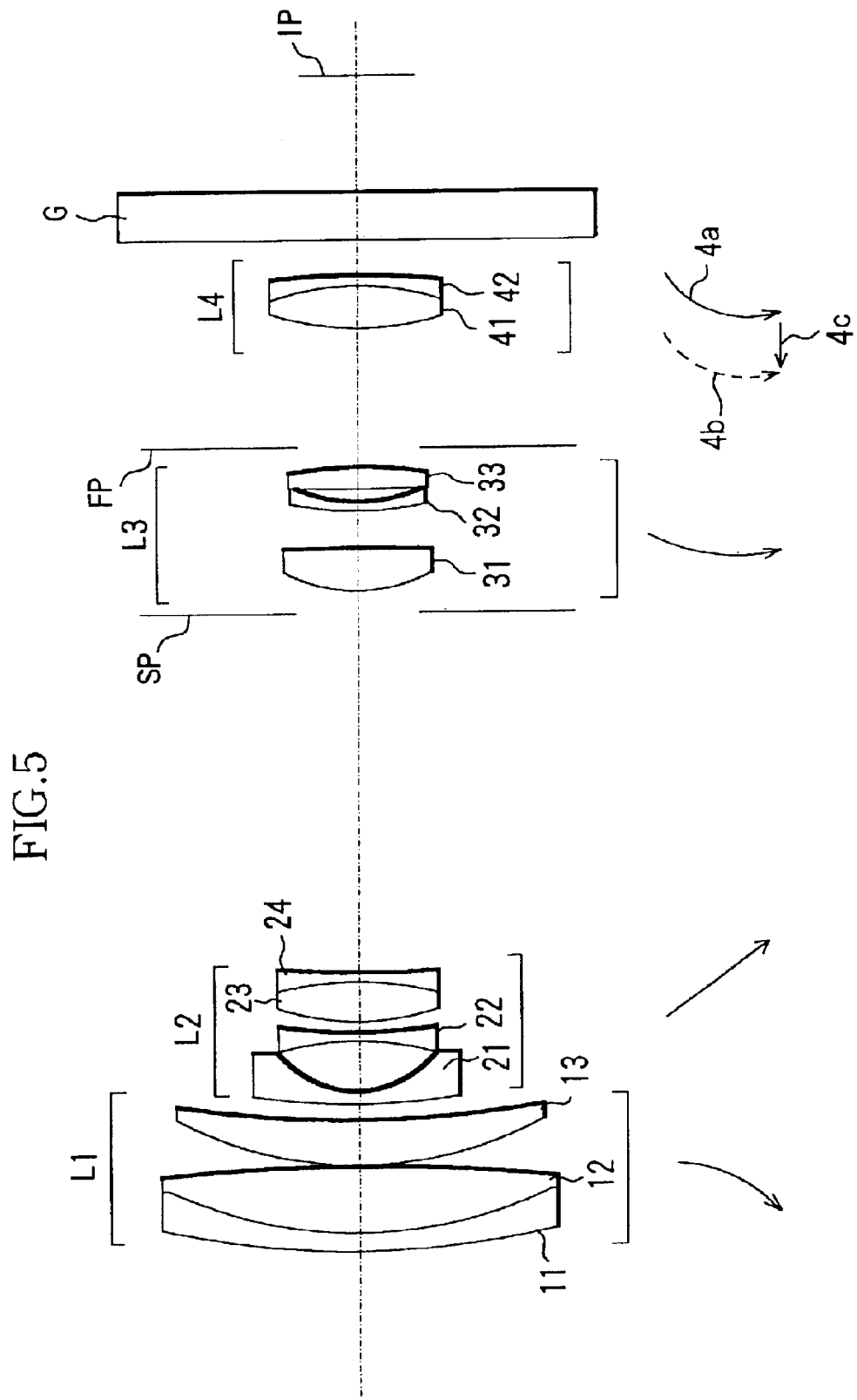
FIG. 5 is a section view of lenses of a zoom lens in Embodiment 2 of the present invention.
Figure 6:
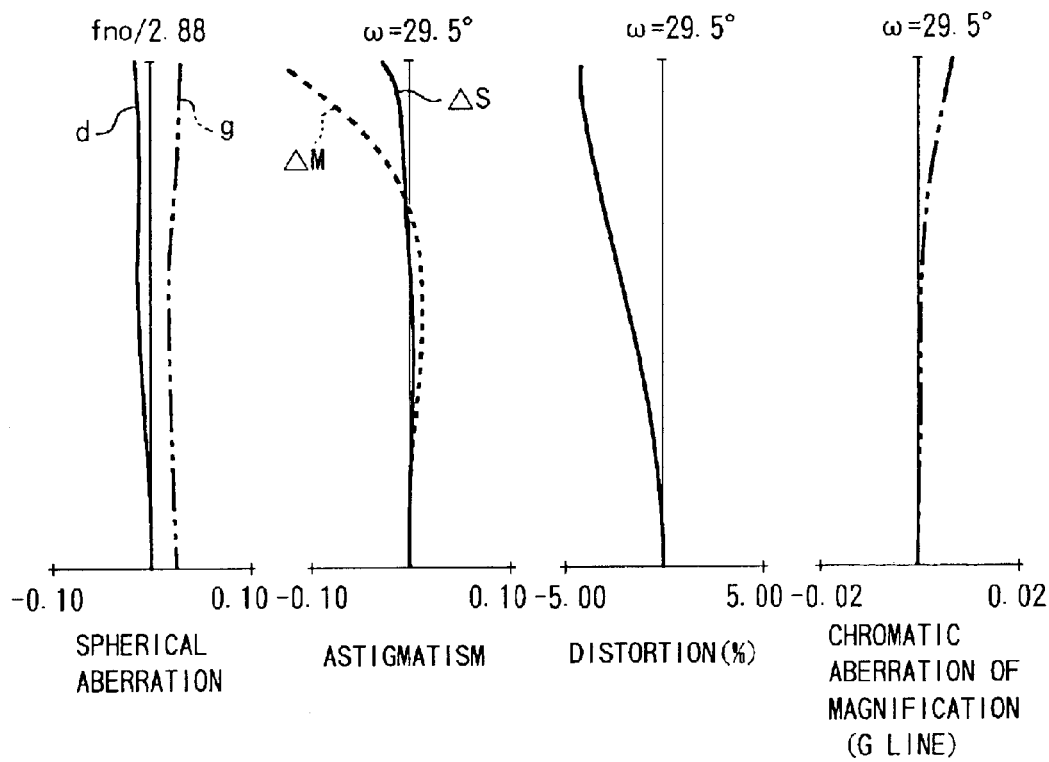
FIG. 6 shows aberrations at the wide angle end in Embodiment 2 of the present invention.
Figure 7:
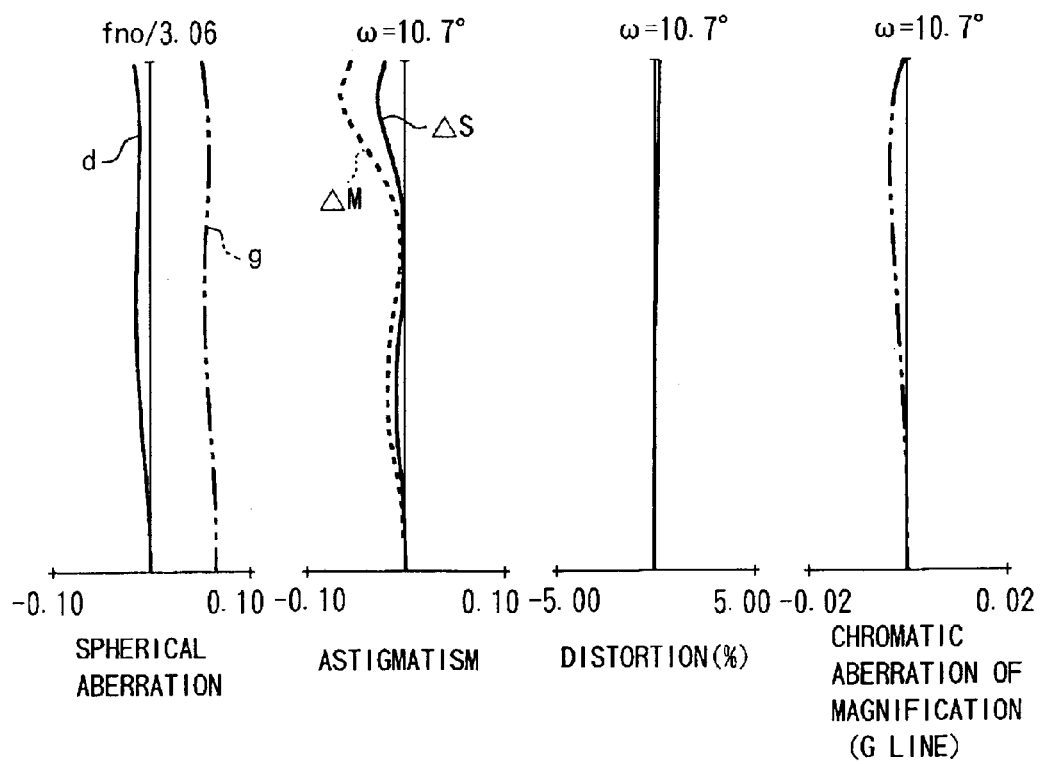
FIG. 7 shows aberrations at an intermediate zoom position in Embodiment 2 of the present invention.
Figure 8:
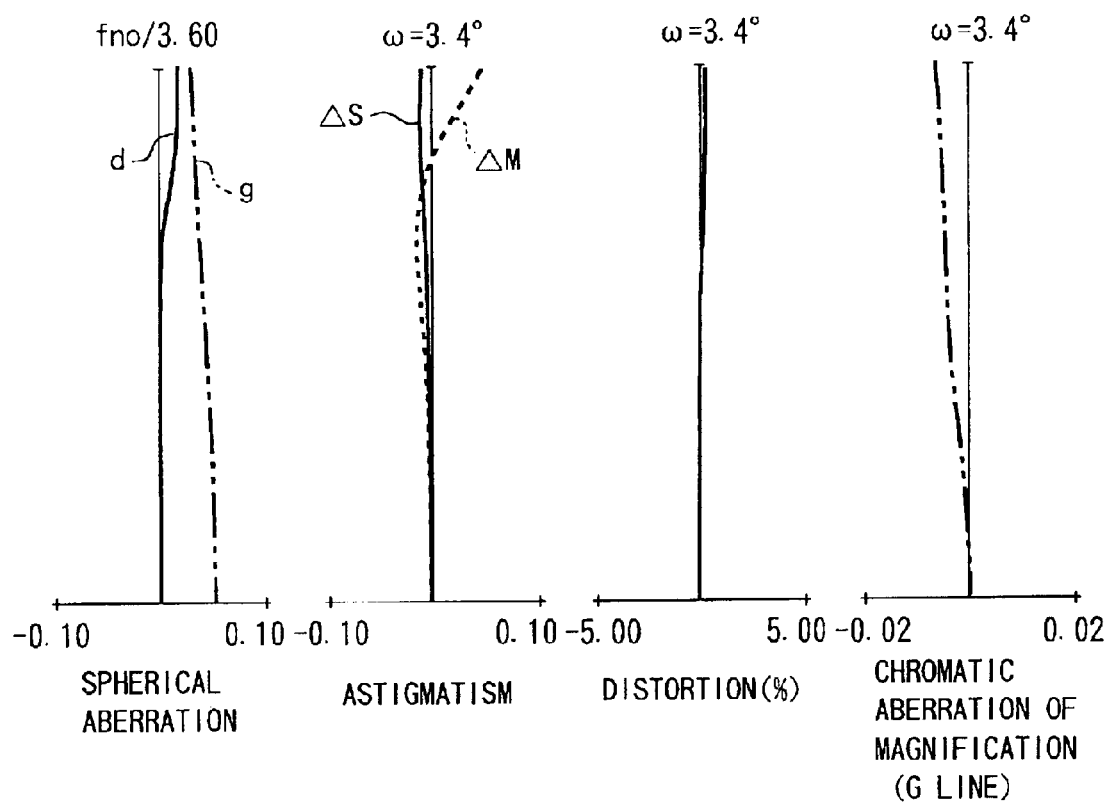
FIG. 8 shows aberrations at the telephoto end in Embodiment 2 of the present invention.

FIG. 5 is a section view of lenses at the wide angle end of a zoom lens in Embodiment 2 of the present invention. FIGS. 6, 7, and 8 show aberrations at the wide angle end, an intermediate zoom position, and the telephoto end of the zoom lens in Embodiment 2 of the present invention, respectively.

Figure 9:
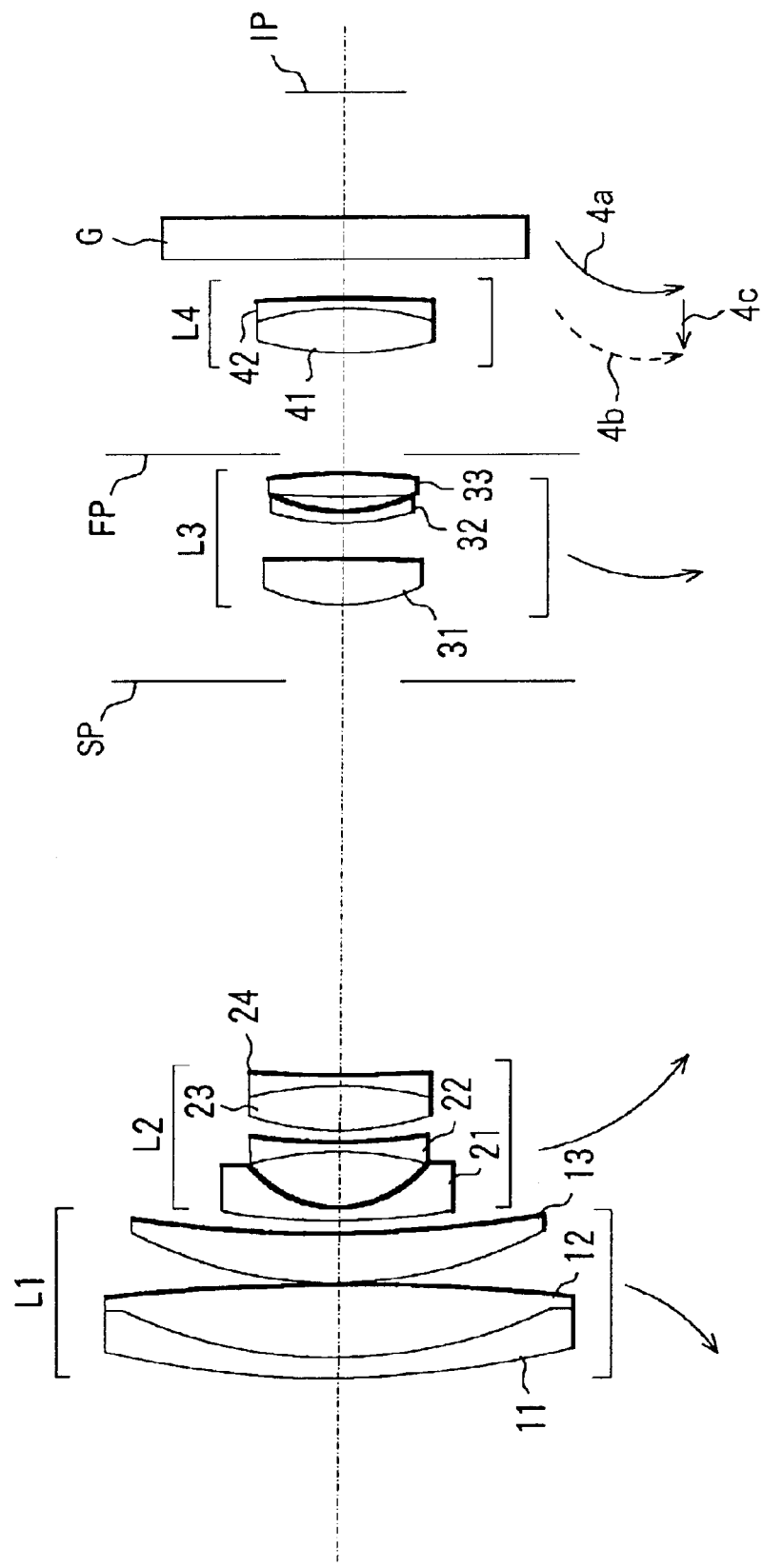
FIG. 9 is a section view of lenses of a zoom lens in Embodiment 3 of the present invention.
Figure 10:
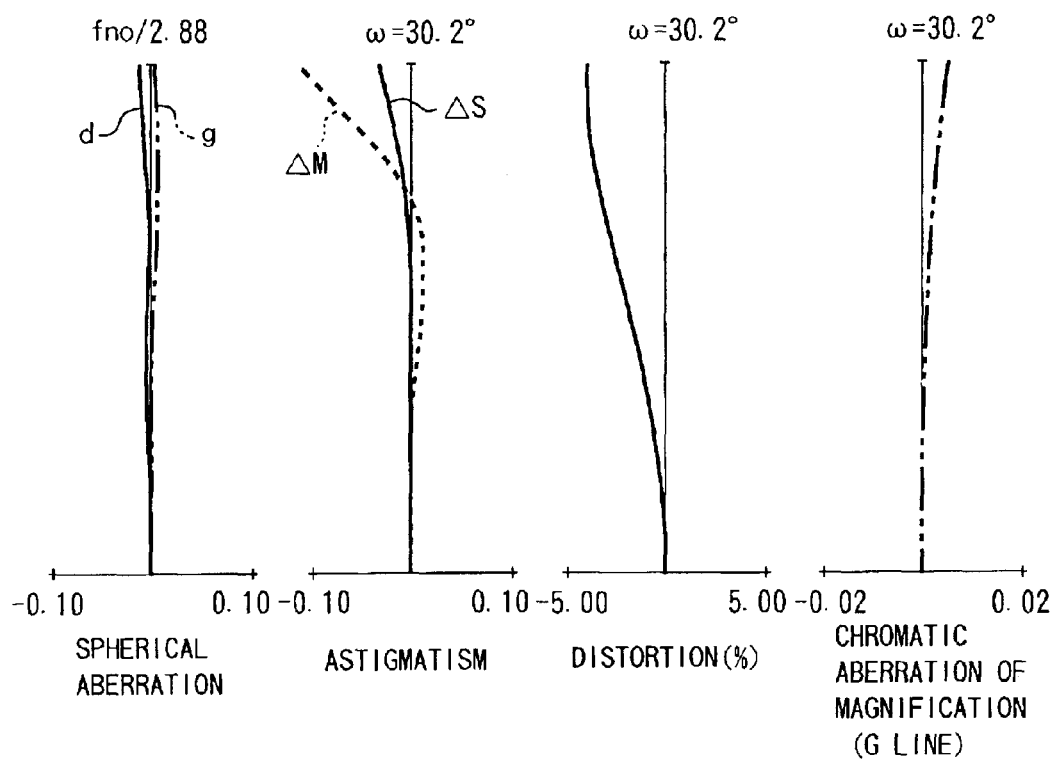
FIG. 10 shows aberrations at the wide angle end in Embodiment 3 of the present invention.
Figure 11:
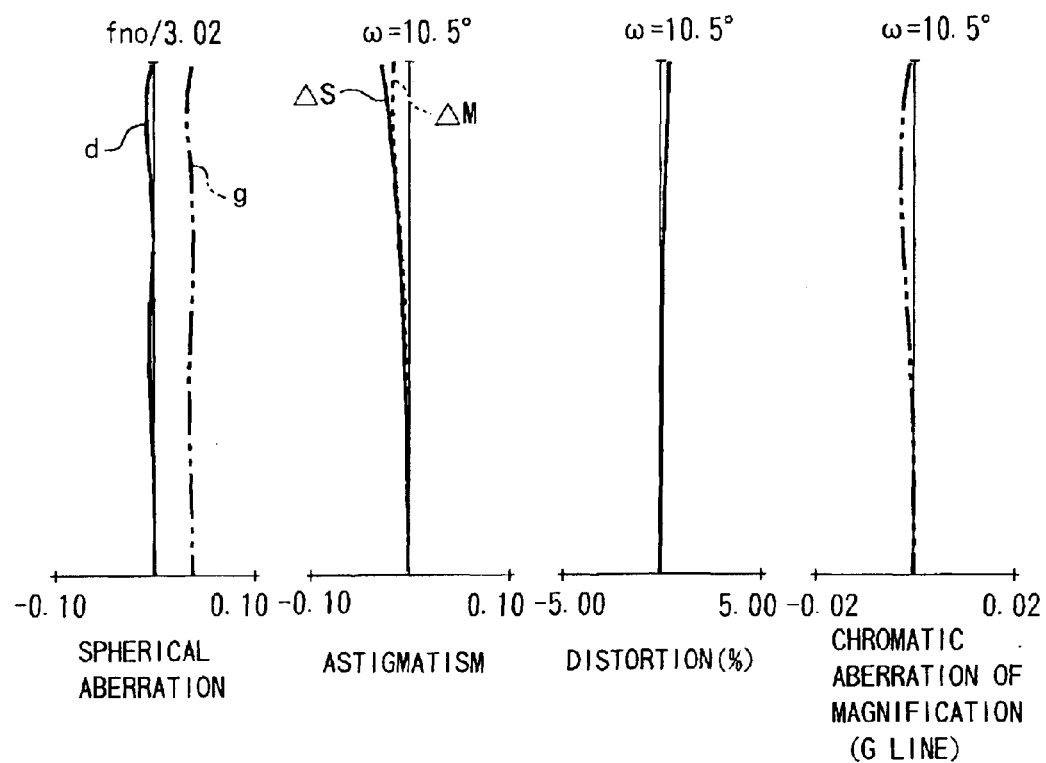
FIG. 11 shows aberrations at an intermediate zoom position in Embodiment 3 of the present invention.
Figure 12:
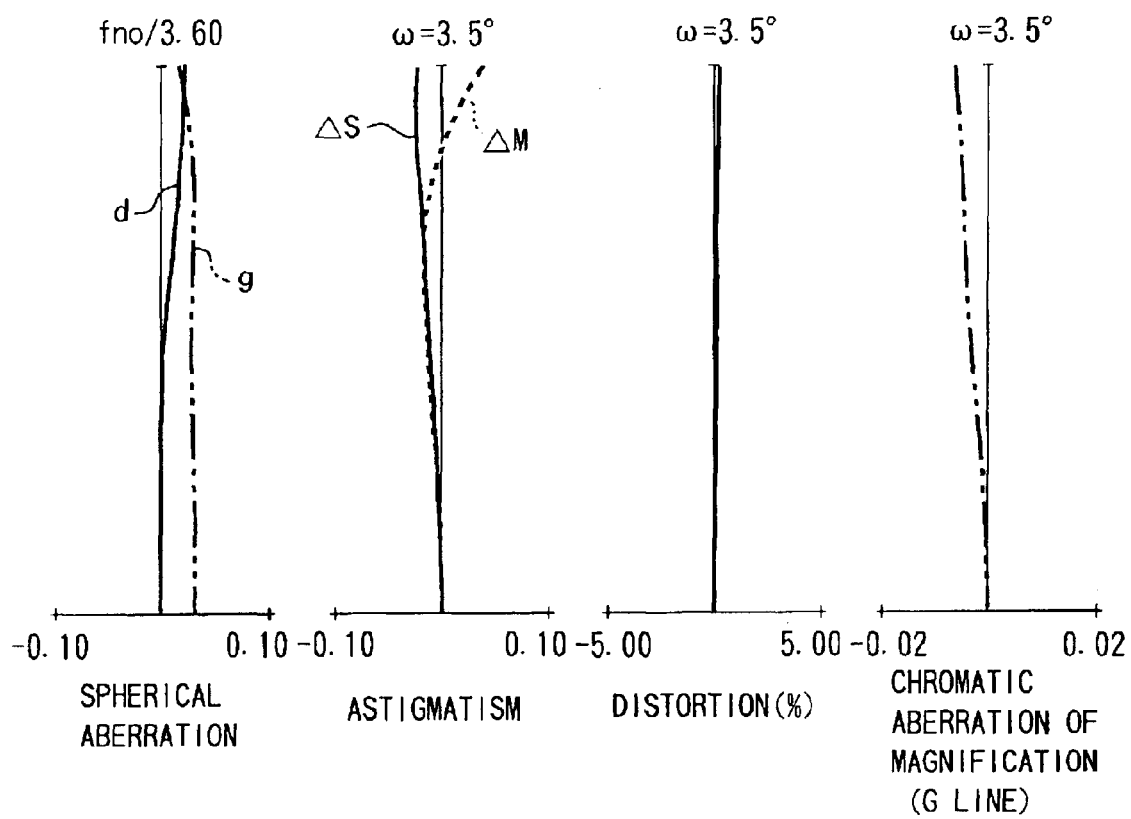
FIG. 12 shows aberrations at the telephoto end in Embodiment 3 of the present invention.

FIG. 9 is a section view of lenses at the wide angle end of a zoom lens in Embodiment 3 of the present invention. FIGS. 10, 11, and 12 show aberrations at the wide angle end, an intermediate zoom position, and the telephoto end of the zoom lens in Embodiment 3 of the present invention, respectively.

Figure 13:
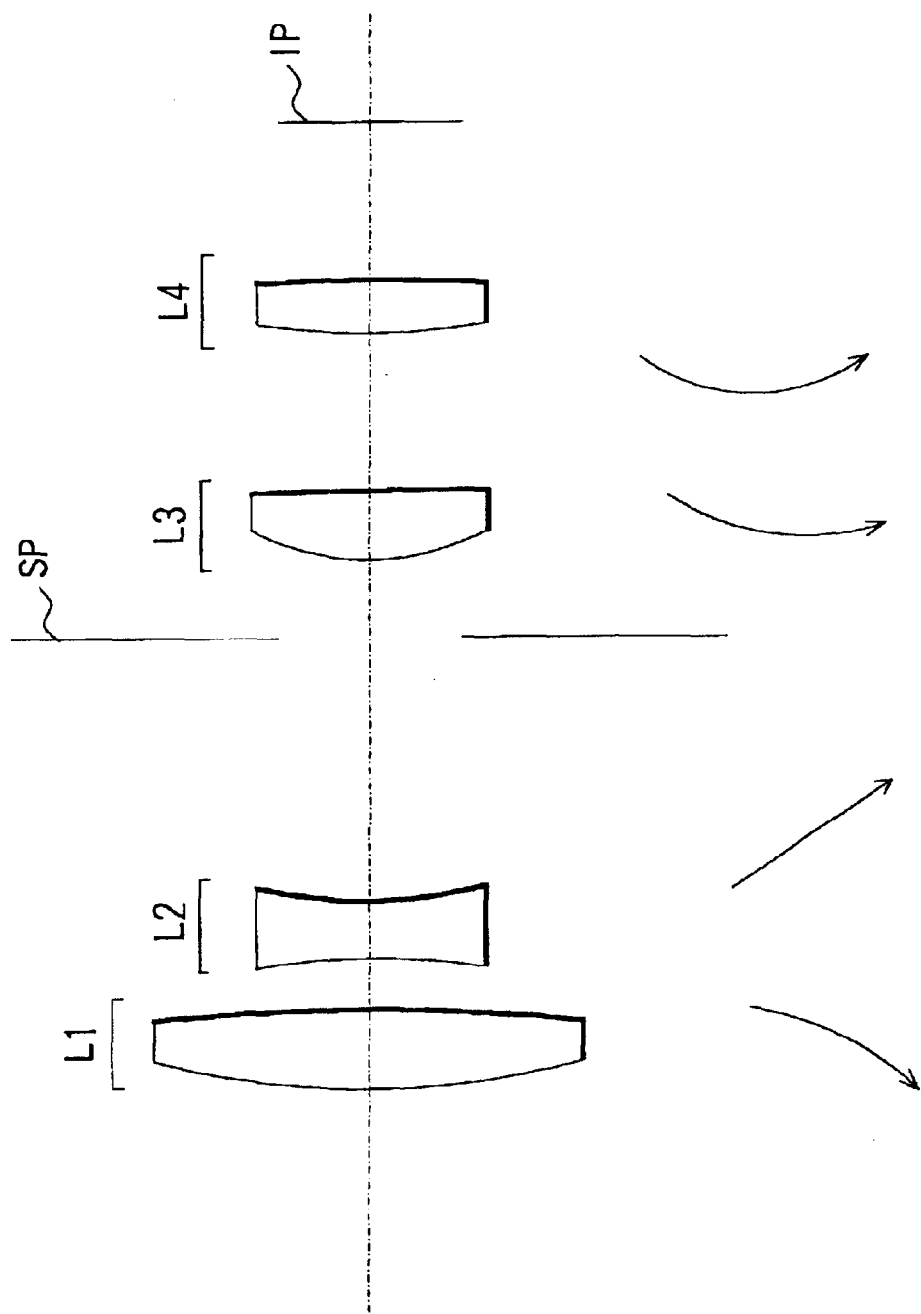
FIG. 13 is a schematic diagram showing a paraxial optical power arrangement in the zoom lens of the present invention.

FIG. 13 is a schematic diagram showing main portions of a paraxial optical power arrangement in the zoom lens of the present invention.

FIGS. 14(A), (B), (C), and (D) are explanatory views of optical principles for correcting an image blur occurring when an optical system vibrates in the present invention.

In the section view of the lenses illustrating the zoom lens in each embodiment and FIG. 13, L1 shows a first lens unit having a positive optical power, L2 a second lens unit having a negative optical power, L3 a third lens unit having a positive optical power, and L4 a fourth lens unit having a positive optical power. SP shows an aperture stop located in front of the third lens unit L3. During zooming, the aperture stop is fixed or moves together with or independently of the third lens unit L3.

G shows an optical block corresponding to an optical filter, a faceplate or the like. IP shows an image plane at which an image-pickup surface of a solid-state image pickup element (photoelectric conversion element) such as a CCD sensor or a CMOS sensor is located. FP shows a flare cut stop which cuts off unnecessary light.

In each embodiment, all lens elements of the third lens unit L3 are moved (displaced) in a direction having a component perpendicular to an optical axis to correct a blur of a taken image (a variation in image forming position) caused when the entire optical system vibrates (is tilted). Thus, vibration isolation is performed without specially adding an optical member such as the variable apical angle prism or a lens unit for vibration isolation. Alternatively, a part of the third lens unit L3 may be moved in the direction having a component perpendicular to the optical axis to correct a blur of a taken image.

In each embodiment, the first lens unit L1 is moved toward an object, the second lens unit L2 is moved toward the image plane, and the third lens unit L3 is moved along a convex track toward the object, and the fourth lens unit L4 is moved, as indicated by arrows during zooming from the wide angle end to the telephoto end. In the movements for the zooming, the first lens unit L1 is positioned closer to the object at the telephoto end than at the wide angle end, the second lens unit L2 is positioned closer to the image plane at the telephoto end than at the wide angle end, and the third lens unit L3 is positioned closer to the object at the telephoto end than at the wide angle end. Specifically, the third lens unit L3 is moved to have a part of the convex track toward the object to ensure marginal rays at an intermediate zoom position, thereby reducing an increase in diameter of the frontmost lens unit (the first lens unit L1) to achieve a reduction in size of the frontmost lens unit.

In addition, the first lens unit L1 is moved to be positioned closer to the object and the second lens unit L2 is moved to be positioned closer to the image plane at the telephoto end than at the wide angle end. Thus, a high zoom ratio can be achieved while a short overall length of the zoom lens is maintained. Also, each embodiment employs a rear focus system in which the fourth lens unit L4 is moved on the optical axis to achieve focus. A solid line curve 4a and a dotted line curve 4b associated with the fourth lens unit L4 show the tracks of movement thereof during zooming from the wide angle end to the telephoto end when an object at infinity and an object at a short distance are brought into focus, respectively.

In each embodiment, the fourth lens unit L4 is moved to have a convex track toward the object or moved monotonously (without changing the direction to move) toward the object during zooming from the wide angle end to the telephoto end. For example, in the case where the fourth lens unit L4 is moved to have the convex track toward the object from the wide angle end to a substantially intermediate zoom position, and thereafter, is moved toward the image plane. The substantially intermediate zoom position is given by:

$$\sqrt{fw \cdot ft} \qquad (1)$$

where fw and ft represent the focal lengths of the entire system at the wide angle end and the telephoto end, respectively. This attains the effective use of the space between the third lens unit L3 and the fourth lens unit L4 to effectively achieve a reduction in the overall length of the zoom lens. In each embodiment, when the focus is shifted to an object at a short distance from an object at infinity at the telephoto end, for example, the fourth lens unit L4 is moved forward as shown by an arrow 4c.

In this manner, the fourth lens unit L4, which has a relatively small effective diameter and light weight, is used to achieve focus in each embodiment. As a result, load on an actuator (not shown) for deriving the fourth lens unit L4 can be reduced to facilitate quick focusing.

It should be noted that the wide angle end and the telephoto end refer to zoom positions at which each lens unit is positioned at both ends of a mechanically movable range on the optical axis during zooming.

In each embodiment, the third lens unit L3 is moved (displaced) in the direction having a component perpendicular to the optical axis to correct an image blur caused when the entire optical system vibrates. Thus, vibration isolation is performed without specially adding an optical member such as the variable apical angle prism or a lens unit for vibration isolation to prevent the entire lens system from being increased in size.

Figure 14:
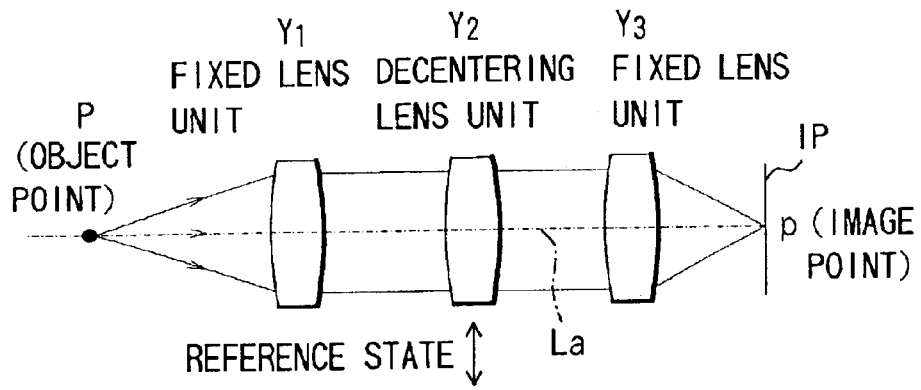
FIGS. 14(A), (B), (C), and (D) are explanatory views of optical principles for vibration isolation in the present invention.
Figure 14:
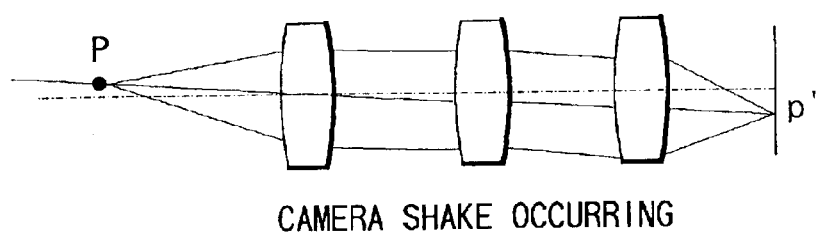
Figure 14:
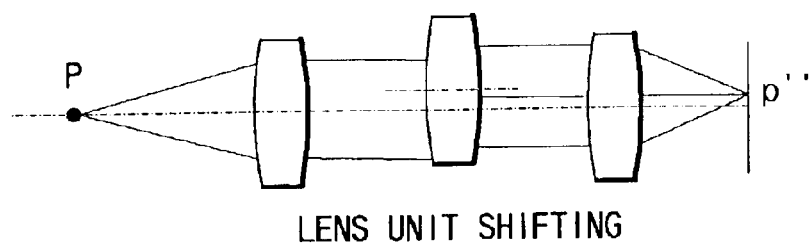
Figure 14:
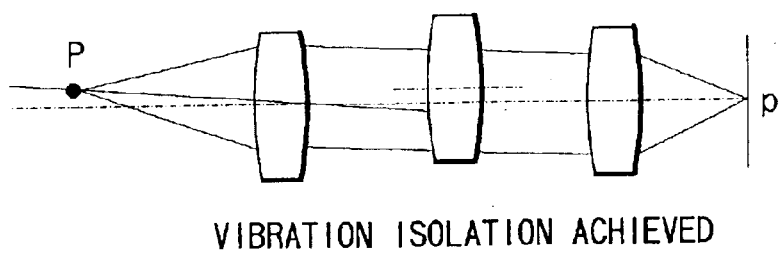

Next, description is made for the optical principles of a vibration isolation system for correcting an image blur by moving the lens unit in the direction having a component perpendicular to the optical axis with reference to FIG. 14.

As shown in FIG. 14(A), the optical system is assumed to comprise three lens units, that is, in order from an object point P side, a fixed unit (fixed lens unit) Y1, a decentering unit (decentering lens unit or shift unit) Y2, and a fixed unit (fixed lens unit) Y3. Light rays from the object point P on an optical axis La located sufficiently away from the optical system forms an image onto an image point p at the center of the image plane IP. If the entire optical system including the image plane IP is instantaneously tilted due to camera shake as shown in FIG. 14(B), the image point corresponding to the object point P also instantaneously moves to a point p' to create a blurred image.

On the other hand, when the decentering unit Y2 is moved in a direction perpendicular to the optical axis La from the state shown in FIG. 14(A), the image point p moves to a point p" as shown in FIG. 14(C). The amount and direction of the movement of the image point depend on the optical power arrangement of the optical system. Herein, the ratio between the movement amount of the decentering lens unit Y2 and the movement amount of the image point is represented as decentering sensitivity of the decentering lens unit Y2. Thus, the image point p' displaced due to the camera shake as shown in FIG. 14(B) is returned to the initial image forming position (image point p) by moving the decentering unit Y2 in an appropriate direction perpendicular to the optical axis by an appropriate amount. In this manner, camera shake correction or vibration isolation is achieved as shown in FIG. 14(D).

The movement amount (shift amount) $\Delta$ of the decentering unit Y2 required for correcting the optical axis by $\theta$ degrees is given by:

$$\Delta = f \cdot \tan(\theta)/TS \qquad (2)$$

where f represents the focal length of the entire optical system, and TS represents the decentering sensitivity of the decentering unit Y2.

The decentering sensitivity TS is represented as a ratio of the movement amount $\Delta L$ of the shift unit Y2 to the movement amount $\Delta I$ of an image on the image plane when the shift unit Y2 is moved in a direction perpendicular to the optical axis La, as follows:

$$TS = \Delta I/\Delta L \qquad (3)$$

When the decentering sensitivity TS of the decentering unit Y2 is too large, the movement amount $\Delta$ has a small value, and the decentering unit Y2 requires only a small movement amount $\Delta L$ for vibration isolation. In this case, however, it is difficult to perform control for appropriate vibration isolation to cause insufficient correction of an image blur. Especially in a video camera or a digital still camera, since an image pickup element such as a CCD sensor or a CMOS sensor has an image size smaller than that of a silver film and thus a smaller focal length for the same field angle, the movement amount $\Delta$ of the decentering unit Y2 is smaller for correcting the same blur angle. Thus, if their mechanisms have equivalent levels of accuracy, the former has relatively large insufficient correction of an image blur on an image plane.

On the other hand, if the decentering sensitivity TS is too small, the decentering unit Y2 must be moved by a large amount for control to increase the size of a driving means such as an actuator for driving the decentering unit Y2. Thus, in each embodiment, the following expression is satisfied:

$$0.5 < TS < 2.5 \qquad (4)$$

In each embodiment, the optical power arrangement of the respective lens units is set to appropriate values to provide an appropriate value for the decentering sensitivity TS of the third lens unit L3. It is thus possible to realize the zoom lens which reduces insufficient correction of an image blur in vibration isolation due to control errors of the mechanism and which involves a lighter load on the driving means such as an actuator.

When the decentering sensitivity TS of the decentering unit Y2 is larger than the upper limit in the expression (4), the shift amount Δ has a small value and thus the decentering unit Y2 has only to be moved by a small movement amount for vibration isolation. However, it is difficult to perform control for appropriate vibration isolation, and insufficient correction of an image blur is caused.

Especially, in a video camera or a digital still camera, since an image pickup element such as a CCD sensor has an image size smaller than that of a silver film and thus a smaller focal length for the same filed angle, the shift amount Δ of the decentering unit Y2 is smaller for correcting the same blur angle.

Thus, if their mechanisms have equivalent levels of accuracy, the former has relatively large insufficient correction of an image blur on an image plane.

On the other hand, if the decentering sensitivity TS is smaller than the lower limit in the expression (4), the decentering unit Y2 must be moved by a large amount for control to increase the size of a driving means such as an actuator for driving the decentering unit Y2. Especially for a solid-state image pickup element with small pixels, it is desirable that the expression (4) is changed as follows to provide more favorable vibration isolation:

$$0.8 < TS < 1.3 \quad (5)$$

Next, features of the lens structure in each embodiment other than the foregoing are described.

To reduce the size of the overall length of the zoom lens, the following condition is desirably satisfied:

$$0.5 < f1/ft < 1.0 \quad (6)$$

where f1 represents the focal length of the first lens unit L1, and ft represents the focal length of the entire system at the telephoto end.

Such a large value of the optical power of the first lens unit L1 as to make the value of the ratio smaller than the lower limit in the conditional expression (6) is advantageous to a reduction in the overall length of the zoom lens. However, a distorted image plane due to manufacturing errors or image vibrations during zooming often occur to create the need of a lens barrel (not shown) made with high accuracy. On the other hand, a larger value of the ratio than the upper limit in the conditional expression (6) is not preferable since the first lens unit L1 or the second lens unit L2 must be moved by an unacceptably large amount for zooming, thereby failing to reduce the size sufficiently.

More desirably, to provide both a further reduced size and higher performance, the following condition is satisfied:

$$0.55 < f1/ft21\ 0.8 \quad (7)$$

For the movement of the first lens unit L1 and the second lens unit L2 in the optical axis direction during zooming, the following conditional expression is satisfied:

$$0.05 < |m1/m2| < 0.5 \quad (8)$$

where m1 and m2 represent the movement amounts of the first lens unit L1 and the second lens unit L2 in the optical axis direction required for zooming from the wide angle end to the telephoto end, respectively (the distance between the position of the lens unit at the wide angle end and the position of the lens unit at the telephoto end). The conditional expression (8) enables a reduced overall length of the zoom lens at the wide angle end and a reduced diameter of the frontmost lens unit. If the movement amount of the first lens unit L1 relative to the movement amount of the second lens unit L2 becomes small to make the value of the ratio smaller than the lower limit in the conditional expression (8), the overall length of the zoom lens at the wide angle end and the diameter of the frontmost lens unit are not reduced sufficiently. On the other hand, such a large movement amount of the first lens unit L1 relative to the movement amount of the second lens unit L2 as to make the value of the ratio larger than the upper limit in the conditional expression (8) is not preferable since the track (curve) of a cam provided a lens barrel (not shown) for moving the first lens unit L1 forward becomes tight or the structure of the lens barrel is complicated.

To achieve a further reduction in size and a simplified structure of the lens barrel having a gentler angle in the cam curve or the like, the numeric value range in the conditional expression (8) is more desirably set as follows:

$$0.07 < |m1/m2| < 0.3 \quad (9)$$

To achieve a reduction in the overall length of the zoom lens while high optical performance is maintained, the following conditional expression is preferably satisfied:

$$0.25 < |f2|/\sqrt{fw \cdot ft} < 0.6 \quad (10)$$

where fw and ft represent the focal lengths of the entire system at the wide angle end and the telephoto end.

Such a large value of the optical power of the second lens unit L2 as to make the value of the ratio smaller than the lower limit in the conditional expression (10) is not preferable since the Petzval sum is a negative large number as a whole to cause difficulty in correcting curvature of image, although the movement amount of the second lens unit L2 is reduced during zooming. On the other hand, a larger value of the ratio than the upper limit in the conditional expression (10) is not preferable since the second lens unit L2 must be moved by a large movement amount during zooming, and thus a reduction in size is difficult to achieve.

To facilitate both a further reduced size and higher performance, the numeric value range in the conditional expression (10) is more desirably set as follows:

$$0.35 < |f2|/\sqrt{fw \cdot ft} < 0.55 \quad (11)$$

When the requirements of the structure and the movement conditions of each lens unit, and the conditional expressions (6) to (11) are satisfied, a general zoom lens can achieve a necessary and sufficient reduction in size, not limited to the zoom lens having the vibration isolation function.

Next, Embodiments 1 to 3 are described. For the lens structures of the respective embodiments, Embodiment 1 is shown in FIG. 1, Embodiment 2 in FIG. 5, and Embodiment 3 in FIG. 9. In each embodiment, the first lens unit L1 desirably comprises at least one negative lens and two positive lenses to favorably correct spherical aberration and axial chromatic aberration at the telephoto end. More desirably, the first lens unit L1 comprises, in order from an object side, a meniscus negative lens 11 having a concave surface toward the image plane, a positive lens 12, and a meniscus positive lens 13 having a convex surface toward the object.

The second lens unit L2 desirably comprises at least two negative lenses and a positive lens from the viewpoint of aberration correction. To favorably correct distortion and astigmatism at the wide angle end, the second lens unit L2 desirably comprises, in order from an object side, a meniscus negative lens 21 having a concave surface toward the image plane, a biconcave negative lens 22, and a positive lens 23. In addition, desirably, the second lens unit L2 further comprises a negative lens 24 on the image plane side of the positive lens 23 to favorably correct chromatic aberration of magnification throughout the zooming range.

Typically, a zoom lens is designed such that the aberration amount of the entire optical system falls within a certain range throughout the zooming range (throughout the range of variable magnification). When the optical power arrangement of the respective lens units is determined, the aberration amount is allocated to the respective lens units substantially at values in a certain range. If the allocated aberration of each lens unit is zero, no problem occurs. In reality, however, this is not the case due to the lens structure and the like. The degradation of optical performance during camera shake correction is determined by the aberration of the decentering optical system and of the lens unit on the object side thereof, and especially, the aberration of the decentering lens unit itself is mainly responsible. Thus, it is difficult in the zoom lens to achieve correction of aberration both when no decentering is performed and when decentering is performed to correct camera shake.

Thus, in each embodiment, the third lens unit L3 comprises two positive lenses and a negative lens to reduce the aberration caused by the third lens unit L3 itself, thereby reducing decentering aberration such as comatic aberration, decentering astigmatism and decentering chromatic aberration of magnification occurring when vibration isolation is performed.

Especially for reducing the aberration during vibration isolation while the overall length of the zoom lens after the third lens unit is reduced, the third lens unit L3 desirably comprises a positive lens 31 which has a convex surface toward the object and a meniscus negative lens 32 in which an absolute value of optical power of an image plane side surface is larger than that of an object side surface and which has a concave surface toward the image plane. In addition, an aspheric surface formed in the third lens unit L3 is effective for correction of spherical aberration and chromatic aberration. To more effectively correct the aberration, the third lens unit L3 desirably comprises an additional positive lens 33.

The third lens unit L3 advantageously has an aspheric surface shaped to have a positive optical power which reduces from the center toward the periphery of the lens in order to effectively correct the spherical aberration.

Preferably, the aperture stop is disposed on the object side of the third lens unit L3 and is moved together with the third lens unit L3. This achieves a reduction in the diameter of the frontmost lens unit and facilitates a simplified structure of the mechanism.

The fourth lens unit L4 preferably comprises a positive lens 41 and a negative lens 42. This allows favorable correction of variations in spherical aberration and curvature of image caused by the movement of the fourth lens unit L4 during zooming or focusing.

In addition, to correct variations in astigmatism and distortion during zooming, the fourth lens unit L4 preferably includes an aspheric surface.

To achieve a reduced size of the entire optical system, it is desirable that the third lens unit L3 comprises the meniscus negative lens 32 having the concave surface toward the image plane and that the following condition is satisfied:

$$0.8 < |f32/f3| < 1.5 \tag{12}$$

where f3 and f32 represents the focal lengths of the third lens unit L3 and the negative lens 32.

Such a large value of the optical power of the negative lens 32 in the third lens unit L3 as to make the value of the ratio smaller than the lower limit in the conditional expression (12) is advantageous to a reduction in the overall length of the zoom lens. However, this is not preferable since the Petzval sum is a negative large number to cause difficulty in correcting curvature of image. On the other hand, a larger value than the upper limit in the conditional expression (12) is not preferable since the overall length of the zoom lens is not sufficiently reduced, and chromatic aberration is not sufficiently corrected in the third lens unit L3 to increase the decentering chromatic aberration of magnification.

To achieve a reduced overall length of the zoom lens and a smaller diameter of the frontmost lens unit, the following condition is preferably satisfied:

$$0.1 < |m3/m2| < 0.3 \tag{13}$$

where m2 and m3 represent the movement amounts of the second lens unit L2 and the third lens unit L3 from the wide angle end to the telephoto end, respectively (the distance between the position of the lens unit at the wide angle end and the position of the lens unit at the telephoto end). If the movement amount of the third lens unit L3 relative to the movement amount of the second lens unit L2 becomes smaller to make the value of the ratio larger than the lower limit in the conditional expression (13), the diameter of the frontmost lens unit is not reduced sufficiently. On the other hand, such a larger movement amount of the third lens unit L3 as to make the value of the ratio larger than the upper limit is not preferable since large space is required for the movement of the vibration isolation mechanism to cause difficulty in reducing the size of the lens barrel.

The flare cut stop, which moves together with the third lens unit L3 during zooming and is fixed during vibration isolation, is preferably disposed on the image plane side of the third lens unit L3. This enables unnecessary light to be cut off at an intermediate zoom position.

In Embodiments 1 and 2, the aperture stop SP moves together with the third lens unit L3 during zooming to reduce the number of the independently moving units to simplify the lens barrel structure. However, if the collapsible lens barrel is not necessarily required, the aperture stop SP may be fixed in the optical axis direction during zooming as in Embodiment 3 to lighten the load on the driving means (actuator or the like) for zooming.

Figure 15:
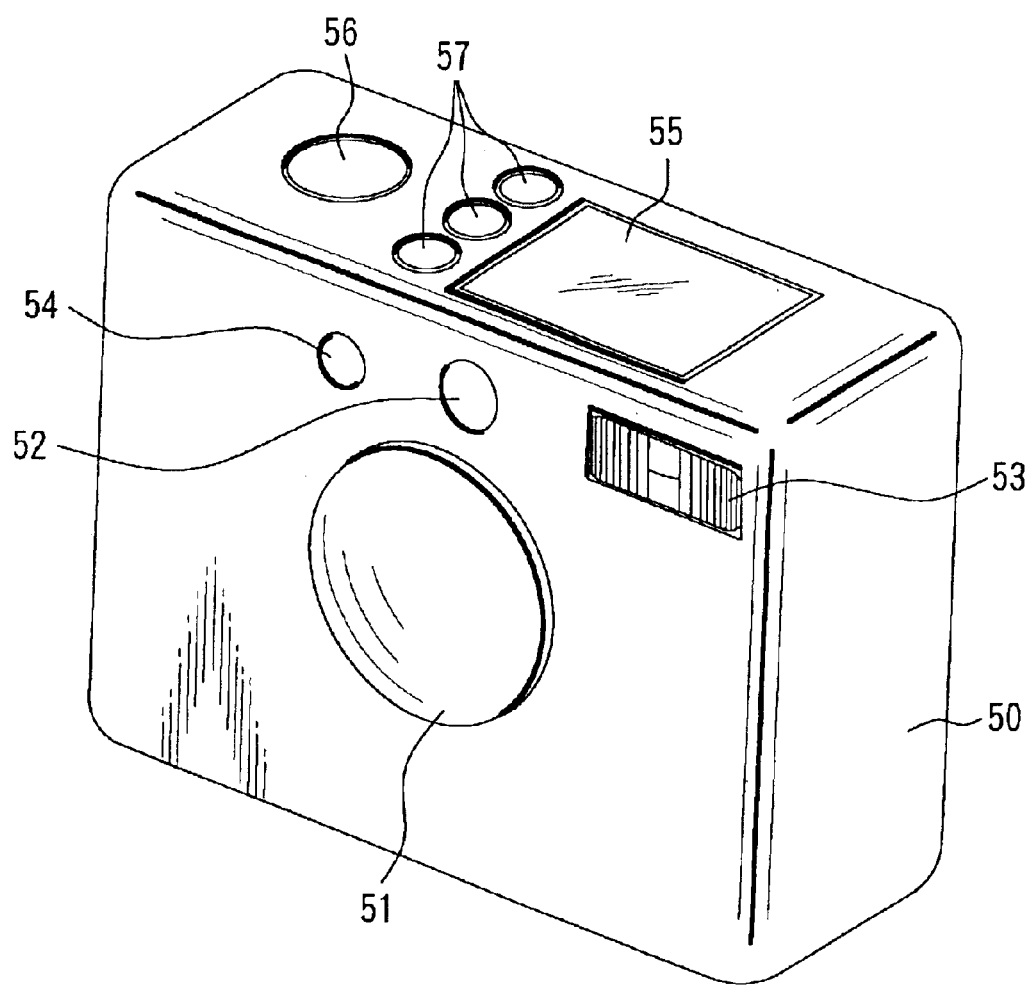
FIG. 15 is a schematic diagram of main portions of an optical apparatus of the present invention.

Next, description is made for an embodiment of a digital still camera (optical apparatus) which uses the zoom lens of the present invention as an image-taking optical system with reference to FIG. 15.

In FIG. 15, reference numeral 50 shows a camera body, 51 an image-taking optical system formed of the zoom lens of the present invention, and 52 a viewfinder for observing an object image. The image-taking optical system 51 forms an object image on a solid-stage image pickup element (not shown) such as a CCD sensor and a CMOS sensor.

Reference numeral 53 shows an electronic flash, 54 a photometry window, 55 a liquid crystal display window for showing the operation of the camera, 56 a release button, and 57 operation switches for switching among various operation modes. The zoom lens of the present invention is applied to the optical apparatus in this manner to realize an optical apparatus with a small size and high optical performance.

With the structure as described above, it is possible to realize the zoom lens which favorably corrects chromatic aberration at the telephoto end and has satisfactory optical performance throughout the zooming range according to the respective embodiments.

Next, numerical examples 1 to 3 are shown corresponding to Embodiments 1 to 3, respectively. In each numerical example, i shows the order of an optical surface from the object side, Ri the radius of curvature of the i-th optical surface (i-th surface), Di the spacing between the i-th surface and the (i+1)th surface, Ni and νi the refractive index and the Abbe number of the material of the i-th optical member for the d line. An aspheric shape is represented by:

$$x=(h^2/R)/[1+\{1-(1+k)(h/R)^2\}^{1/2}]+A'h^3+Bh^4+B'h^5+Ch^6+C'h^7+Dh^8+Eh^{10} \quad (14)$$

where k is the eccentricity, A, B, B', C, C', D, E, . . . are aspheric coefficients, x is the displacement in the optical axis direction at a height h from the optical axis relative to the surface vertex, and R is the radius of curvature. For example, "e-Z" means "$10^{-z}$." Table 1 shows the values calculated with the aforementioned conditional expressions in the respective numerical examples. The letter f represents the focal length, Fno the F number, and ω the half field angle.

Numerical Example 1

| f = 5.88~56.67  Fno = 2.88~3.06  2ω = 58.9°~6.7° | | | |
|---|---|---|---|
| R1 = 56.279 | D1 = 1.20 | N1 = 1.846660 | ν1 = 23.9 |
| R2 = 28.538 | D2 = 4.10 | N2 = 1.487490 | ν2 = 70.2 |
| R3 = −169.292 | D3 = 0.20 | | |
| R4 = 24.791 | D4 = 2.80 | N3 = 1.772499 | ν3 = 49.6 |
| R5 = 72.843 | D5 = Variable | | |
| R6 = 42.549 | D6 = 0.70 | N4 = 1.834000 | ν4 = 37.2 |
| R7 = 6.546 | D7 = 3.19 | | |
| R8 = −19.214 | D8 = 0.60 | N5 = 1.806098 | ν5 = 40.9 |
| R9 = 38.463 | D9 = 0.66 | | |
| R10 = 15.807 | D10 = 2.50 | N6 = 1.846660 | ν6 = 23.9 |
| R11 = −21.435 | D11 = 0.60 | N7 = 1.772499 | ν7 = 49.6 |
| R12 = 85.662 | D12 = Variable | | |
| R13 = Aperture Stop | D13 = 1.40 | | |
| R14 = 9.497 (Aspheric Surface) | D14 = 2.60 | N8 = 1.583126 | ν8 = 59.4 |
| R15 = −241.418 (Aspheric Surface) | D15 = 2.16 | | |
| R16 = 15.564 | D16 = 0.60 | N9 = 1.846660 | ν9 = 23.9 |
| R17 = 8.552 | D17 = 0.82 | | |
| R18 = 54.419 | D18 = 1.40 | N10 = 1.487490 | ν10 = 70.2 |
| R19 = −35.119 | D19 = 1.11 | | |
| R20 = Fixed Stop | D20 = Variable | | |
| R21 = 17.183 | D21 = 2.60 | N11 = 1.696797 | ν11 = 55.5 |
| R22 = −17.183 | D22 = 0.60 | N12 = 1.846660 | ν12 = 23.9 |
| R23 = −76.154 | D23 = Variable | | |
| R24 = ∞ | D24 = 2.20 | N13 = 1.516330 | ν13 = 64.1 |
| R25 = ∞ | | | |

| Variable | Focal Length | | |
|---|---|---|---|
| Separation | 5.88 | 27.80 | 56.67 |
| D5 | 0.80 | 17.90 | 23.44 |
| D12 | 24.21 | 5.54 | 1.82 |
| D20 | 7.12 | 5.73 | 10.23 |
| D23 | 2.20 | 7.13 | 2.09 |

| Aspheric Coefficients | | | |
|---|---|---|---|
| R14 | k = −4.94686e−2 | B = −6.13948e−5 | C = 9.11922e−6 |
| | D = 9.24308e−8 | E = −8.07801e−10 | |
| | A' = −4.21914e−5 | B' = −3.56069e−5 | C' = −1.33166e−6 |
| R15 | k = 1.25000e+02 | B = −1.40000e−05 | C = −6.00000e−07 |
| | D = 1.10000e−09 | | |
| | A' = 7.0e−6 | B' = 5.5e−6 | C' = 4.5e−9 |

Numerical Example 2

| f = 5.88~56.67  Fno = 2.88~3.06  2ω = 58.9°~6.7° | | | |
|---|---|---|---|
| R1 = 52.476 | D1 = 1.20 | N1 = 1.846660 | ν1 = 23.9 |
| R2 = 26.273 | D2 = 4.10 | N2 = 1.487490 | ν2 = 70.2 |
| R3 = −145.911 | D3 = 0.20 | | |
| R4 = 22.798 | D4 = 2.80 | N3 = 1.772499 | ν3 = 49.6 |
| R5 = 68.407 | D5 = Variable | | |
| R6 = 44.103 | D6 = 0.70 | N4 = 1.834000 | ν4 = 37.2 |
| R7 = 6.123 | D7 = 2.97 | | |
| R8 = −18.136 | D8 = 0.60 | N5 = 1.806098 | ν5 = 40.9 |
| R9 = 34.016 | D9 = 0.66 | | |
| R10 = 14.870 | D10 = 2.50 | N6 = 1.846660 | ν6 = 23.9 |
| R11 = −14.834 | D11 = 0.60 | N7 = 1.806098 | ν7 = 40.9 |
| R12 = 85.171 | D12 = Variable | | |
| R13 = Aperture Stop | D13 = 1.40 | | |
| R14 = 9.542 (Aspheric Surface) | D14 = 2.60 | N8 = 1.583126 | ν8 = 59.4 |
| R15 = −235.483 (Aspheric Surface) | D15 = 2.16 | | |
| R16 = 15.882 | D16 = 0.60 | N9 = 1.846660 | ν9 = 23.9 |
| R17 = 8.692 | D17 = 0.82 | | |
| R18 = 81.296 | D18 = 1.40 | N10 = 1.487490 | ν10 = 70.2 |
| R19 = −27.905 | D19 = 1.11 | | |
| R20 = Fixed Stop | D20 = Variable | | |
| R21 = 17.184 | D21 = 2.60 | N11 = 1.696797 | ν11 = 55.5 |
| R22 = −15.751 | D22 = 0.60 | N12 = 1.846660 | ν12 = 23.9 |
| R23 = −61.091 | D23 = Variable | | |
| R24 = ∞ | D24 = 2.80 | N13 = 1.516330 | ν13 = 64.1 |
| R25 = ∞ | | | |

| Variable | Focal Length | | |
|---|---|---|---|
| Separation | 5.88 | 27.24 | 56.67 |
| D5 | 0.80 | 16.15 | 21.29 |
| D12 | 21.60 | 4.95 | 1.80 |
| D20 | 7.40 | 5.79 | 10.80 |
| D23 | 2.20 | 7.35 | 1.80 |

| Aspheric Surface | | | |
|---|---|---|---|
| R14 | k = 4.08964e−02 | B = −4.72848e−05 | C = 8.26264e−06 |
| | D = 7.28112e−08 | E = −1.61077e−09 | |
| | A' = −1.34146e−4 | B' = −3.80822e−5 | C' = −1.25032e−6 |
| R15 | k = 5.00000e+02 | B = −4.34217e−05 | C = −4.35126e−06 |
| | D = −1.90457e−08 | | |
| | A' = −3.35471e−5 | B' = 2.73743e−5 | C' = 1.79087e−8 |

Numeric Example 3

| f = 5.70~54.95  Fno = 2.88~3.06  2ω = 60.5°~6.9° | | | |
|---|---|---|---|
| R1 = 57.362 | D1 = 1.20 | N1 = 1.846660 | ν1 = 23.9 |
| R2 = 28.923 | D2 = 4.10 | N2 = 1.487490 | ν2 = 70.2 |
| R3 = −161.490 | D3 = 0.20 | | |
| R4 = 25.004 | D4 = 2.80 | N3 = 1.772499 | ν3 = 49.6 |
| R5 = 73.138 | D5 = Variable | | |
| R6 = 44.140 | D6 = 0.70 | N4 = 1.834000 | ν4 = 37.2 |
| R7 = 6.640 | D7 = 3.13 | | |
| R8 = −18.987 | D8 = 0.60 | N5 = 1.806098 | ν5 = 40.9 |
| R9 = 32.220 | D9 = 0.66 | | |
| R10 = 16.269 | D10 = 2.50 | N6 = 1.846660 | ν6 = 23.9 |
| R11 = −22.260 | D11 = 0.60 | N7 = 1.772499 | ν7 = 49.6 |
| R12 = 346.847 | D12 = Variable | | |
| R13 = Aperture Stop | D13 = 4.40 | | |
| R14 = 9.187 (Aspheric Surface) | D14 = 2.60 | N8 = 1.583126 | ν8 = 59.4 |
| R15 = −421.284 (Aspheric Surface) | D15 = 2.16 | | |
| R16 = 17.477 | D16 = 0.60 | N9 = 1.761821 | ν9 = 26.5 |
| R17 = 8.326 | D17 = 0.82 | | |
| R18 = 63.679 | D18 = 1.40 | N10 = 1.487490 | ν10 = 70.2 |

-continued

| | | | |
|---|---|---|---|
| R19 = −32.982 | D19 = 1.11 | | |
| R20 = Fixed Stop | D20 = Variable | | |
| R21 = 16.607 | D21 = 2.60 | N11 = 1.696797 | v11 = 55.5 |
| R22 = −16.607 | D22 = 0.60 | N12 = 1.846660 | v12 = 23.9 |
| R23 = −82.933 | D23 = Variable | | |
| R24 = ∞ | D24 = 2.20 | N13 = 1.516330 | v13 = 64.1 |
| R25 = ∞ | | | |

| Variable | Focal Length | | |
|---|---|---|---|
| Separation | 5.70 | 28.04 | 54.95 |
| D5 | 0.80 | 18.27 | 23.57 |
| D12 | 22.89 | 6.45 | 1.82 |
| D20 | 5.88 | 4.88 | 8.84 |
| D23 | 2.20 | 6.75 | 2.25 |

Aspheric Corfficients

| | | | |
|---|---|---|---|
| R14 | k = 4.18198e−3 | B = −8.16240e−5 | C = 9.59434e−6 |
| | D = 5.64188e−8 | E = −7.69897e−10 | |
| | A' = −2.368e−5 | B' = −3.62525e−5 | C' = −1.27944e−6 |

TABLE 1

| | Numerical Example | | |
|---|---|---|---|
| Conditional Expression | 1 | 2 | 3 |
| 1  TS | 1.020 | 1.021 | 0.961 |
| 2  f1/ft | 0.673 | 0.614 | 0.700 |
| 3  \|m1/m2\| | 0.167 | 0.219 | 0.081 |
| 4  \|f2\|/√fw·ft | 0.455 | 0.411 | 0.486 |
| 5  \|f32/f3\| | 1.131 | 1.152 | 1.002 |
| 6  \|m3/m2\| | 0.155 | 0.179 | 0.142 |

According to the present invention, it is possible to realize the zoom lens which provides a high variable magnification ratio and high optical performance, and the optical apparatus having the zoom lens.

In addition, according to the present invention, the lens unit which has a relatively small size and light weight and forms a part of the zoom lens is moved in the direction having a component perpendicular to the optical axis to correct an image blur caused when the zoom lens vibrates (it tilted). It is thus possible to achieve the zoom lens with the vibration isolation function in which the decentering aberration is reduced and corrected favorably when the lens unit is decentered, while the entire optical system is reduced in size, the mechanism is simplified, and the load on the driving means for the driving the lens units is lightened. Also, the optical apparatus having the zoom lens is realized according to the present invention.

What is claimed is:

1. A zoom lens comprising, from an object side to an image side:
   a first lens unit which has a positive optical power;
   a second lens unit which has a negative optical power;
   a third lens unit which has a positive optical power; and
   a fourth lens unit which has a positive optical power;
   wherein said third lens unit is movable in a direction having a component perpendicular to an optical axis, and during zooming, said first lens unit is moved to be positioned closer to an object at a telephoto end than at a wide angle end, said second lens unit is moved to be positioned closer to an image plane at the telephoto end than at the wide angle end, said third lens unit is moved to be positioned closer to the object at the telephoto end than at the wide angle end, and said fourth lens unit is moved along a convex track toward the object or moved monotonously toward the object side during zooming from the wide angle end to the telephoto end.

2. The zoom lens according to claim 1, wherein the following condition is satisfied when an object at infinity is brought into focus:

$$0.5 < TS < 2.5$$

where the $\Delta L$ represents a movement amount of said third lens unit in a direction of the component perpendicular to the optical axis, $\Delta I$ represents a movement amount of an image forming position at the image plane at its time, and TS represents decentering sensitivity of said third lens unit defined as:

$$TS = \Delta I / \Delta L.$$

3. The zoom lens according to claim 1, wherein the following condition is satisfied:

$$0.5 < f1/ft < 1.0$$

where f1 and ft represent focal lengths of said first lens unit and an entire system of the zoom lens at the telephoto end, respectively.

4. The zoom lens according to claim 1, wherein the following condition is satisfied:

$$0.05 < |m1/m2| < 0.5$$

where m1 and m2 represent movement amounts of said first lens unit and said seconds lens unit during zooming from the wide angle end to the telephoto end, respectively.

5. The zoom lens according to claim 1, wherein the following condition is satisfied:

$$0.25 < |f2|/\sqrt{fw \cdot ft} < 0.6$$

where fw and ft represent focal lengths of the entire optical system of the zoom lens at the wide angle end and at the telephoto end, and f2 represents a focal length of said second lens unit.

6. The zoom lens according to claim 1, wherein said first lens unit comprises a negative lens and two positive lenses.

7. A zoom lens comprising, from an object side to an image side:
   a first lens unit which has a positive optical power;
   a second lens unit which has a negative optical power;
   a third lens unit which has a positive optical power; and
   a fourth lens unit which has a positive optical power;
   wherein, during zooming, said first lens unit is moved to be positioned closer to an object at a telephoto end than at a wide angel end, said second lens unit is moved to be positioned closer to an image plane at the telephoto end than at the wide angle end, said third lens unit is moved to be positioned closer to the object at the telephoto end than at the wide angle end, and said fourth lens unit is moved to be positioned closer to the object at the telephoto end than at the wide angle, and the following conditions are satisfied:

$$0.5 < f1/ft < 1.0$$

$$0.05 < |m1/m2| < 0.5$$

$$0.25 < |f2|/\sqrt{fw \cdot ft} < 0.6$$

where fi represents of a focal length of the i-th lens unit, fw and ft represents focal lengths of an entire system of the zoom lens at the wide angle end and at the telephoto end, respectively, and m1 and m2 represents movement amounts of said first lens unit and said second lens unit during zooming from the wide angle end to the telephoto end, respectively.

8. The zoom lens according to claim 1, wherein said third lens unit comprises a negative lens in which an absolute value of optical power of an image plane side surface is larger than that of an object side surface, and a positive lens, and said third lens unit includes at least one aspheric surface.

9. The zoom lens according to claim 1, wherein said third lens unit includes an aspheric surface shaped to have a positive optical power which reduces from a center toward a periphery of the surface.

10. The zoom lens according to claim 1, wherein said fourth lens unit is moved in an optical axis direction to achieve focusing.

11. The zoom lens according to claim 1, wherein said third lens unit includes a meniscus negative lens which has a concave surface toward the image plane, and the following condition is satisfied:

$$0.8 < |f32/f3| < 1.5$$

where f3 and f32 represent focal lengths of said third lens unit and said negative lens.

12. The zoom lens according to claim 1, wherein the following condition is satisfied:

$$0.1 < |m3/m2| < 0.3$$

where m2 and m3 represent movement amounts of said second lens unit and said third lens unit from the wide angle end to the telephoto end, respectively.

13. The zoom lens according to claim 1, wherein said zoom lens is an optical system for forming an image on an image pickup element.

14. A camera comprising:

the zoom lens according to claim 1; and an image pickup element which receives light of an image formed by said zoom lens.

15. The zoom lens according to claim 7, wherein said third lens unit comprises a negative lens in which an absolute value of optical power of an image plane side surface is larger than that of an object side surface, and a positive lens, and said third lens unit includes at least one aspheric surface.

16. The zoom lens according to claim 7, wherein said third lens unit includes an aspheric surface shaped to have a positive optical power which reduces from a center toward a periphery of the surface.

17. The zoom lens according to claim 7, wherein said fourth lens unit is moved in an optical axis direction to achieve focusing.

18. The zoom lens according to claim 7, wherein said third lens unit includes a meniscus negative lens which has a concave surface toward the image plane, and the following condition is satisfied:

$$0.8 < |f32/f3| < 1.5$$

where f3 and f32 represent focal lengths of said third lens unit and said negative lens.

19. The zoom lens according to claim 7, wherein the following condition is satisfied:

$$0.1 < |m3/m2| < 0.3$$

where m2 and m3 represent movement amounts of said second lens unit and said third lens unit from the wide angle end to the telephoto end, respectively.

20. The zoom lens according to claim 7, wherein said zoom lens is an optical system for forming an image on an image pickup element.

21. A camera comprising:

the zoom lens according to claim 1; and an image pickup element which receives light of an image formed by said zoom lens.

* * * * *

UNITED STATES PATENT AND TRADEMARK OFFICE
CERTIFICATE OF CORRECTION

| | |
|---|---|
| PATENT NO. | : 7,057,818 B2 |
| APPLICATION NO. | : 10/406757 |
| DATED | : June 6, 2006 |
| INVENTOR(S) | : Hiroyuki Hamano |

It is certified that error appears in the above-identified patent and that said Letters Patent is hereby corrected as shown below:

<u>Column 14</u>

Line 31, replace "seconds" with "second".

Lines 58-60, replace "to be positioned closer to the object at the telephoto end than at the wider angle" with "along a convex track toward the object or moved monotonously toward the object side during zooming from the wide angle end to the telephoto end".

<u>Column 16</u>

Line 37, replace "claim 1" with "claim 7".

Signed and Sealed this

Twenty-second Day of August, 2006

JON W. DUDAS
*Director of the United States Patent and Trademark Office*